US006993758B1

(12) United States Patent
Fujita et al.

(10) Patent No.: US 6,993,758 B1
(45) Date of Patent: Jan. 31, 2006

(54) METHOD AND APPARATUS FOR RENEWING SOFTWARE IN A SOFTWARE-OPERATED MACHINE

(75) Inventors: Masanobu Fujita, Sagamihara (JP); Toitsu Ohya, Sagamihara (JP); Taichi Sato, Sagamihara (JP); Koji Kuroiwa, Sagamihara (JP); Toru Seki, Sagamihara (JP)

(73) Assignee: Japan Cash Machine Co., Ltd., Osaka (JP)

( * ) Notice: Subject to any disclaimer, the term of this patent is extended or adjusted under 35 U.S.C. 154(b) by 0 days.

(21) Appl. No.: 09/890,904

(22) PCT Filed: Dec. 8, 1999

(86) PCT No.: PCT/JP99/06885

§ 371 (c)(1),
(2), (4) Date: Sep. 28, 2001

(87) PCT Pub. No.: WO01/42916

PCT Pub. Date: Jun. 14, 2001

(51) Int. Cl.
*G06F 9/44* (2006.01)

(52) U.S. Cl. .................. 717/168; 717/177; 700/232

(58) Field of Classification Search ........ 717/168–178; 700/230–235
See application file for complete search history.

(56) References Cited

U.S. PATENT DOCUMENTS

| 4,643,425 A * | 2/1987 | Herzenberger ................ 463/17 |
| 4,784,251 A * | 11/1988 | DeWoolfson et al. ....... 194/209 |
| 4,910,510 A | 3/1990 | Davis et al. |
| 5,406,484 A | 4/1995 | Wurzenberger |
| 6,125,307 A * | 9/2000 | Heidel et al. ................ 700/232 |
| 6,141,795 A * | 10/2000 | Laugner ...................... 717/170 |
| 6,183,562 B1 * | 2/2001 | Pierce et al. ................ 118/707 |
| 6,293,867 B1 * | 9/2001 | Heidel et al. ................ 463/25 |
| 6,332,099 B1 * | 12/2001 | Heidel et al. ................ 700/231 |
| 6,404,997 B1 * | 6/2002 | Grace .......................... 399/27 |
| 6,524,230 B1 * | 2/2003 | Harding et al. ................ 493/8 |
| 6,820,259 B1 * | 11/2004 | Kawamata et al. ......... 717/173 |
| 6,895,306 B2 * | 5/2005 | Ebisawa et al. ............ 700/245 |

FOREIGN PATENT DOCUMENTS

EP 0 767 426 4/1997

OTHER PUBLICATIONS

Both et al, "Hardware software codesign of application specific microcontrollers with ASM environment", ACM pp 72-76, 1994.*
Marongiu et al, Parallel dedicated hardware device for heterogenous computations, ACM SC, pp 1-9, 2001.*
Takesue, "A unified resource management and execution control mecanism for data flow machines", ACM pp 90-97, 1987.*

* cited by examiner

*Primary Examiner*—Anil Khatri
(74) *Attorney, Agent, or Firm*—Bachman & LaPointe, P.C.

(57) ABSTRACT

A method and apparatus for renewing software in a software-controlled machine is provided wherein a sensor 16 detects external command information to shift an operation control circuit 50 from an operating mode to a renewal mode, and then detects external operating data on software to store same from the sensor 16 in a program memory 53 of the renewal mode for easy renewal of the software in accordance with renewal control program. Then, the operation control circuit 50 is shifted from the renewal mode to the operating mode to operate the machine with the renewed operating data.

15 Claims, 3 Drawing Sheets

METHOD AND APPARATUS FOR RENEWING SOFTWARE IN A SOFTWARE-OPERATED MACHINE

FIELD OF THE INVENTION

This invention relates to updating of software or program that control functioning of hardware, in particular method and apparatus for easily renewing software without opening a machine equipped with and operated by the software.

BACKGROUND OF THE TECHNOLOGY

Bill validators are used in labor-saving machines such as vending machines, money exchangers or gaming machines. Generally, a typical bill validator comprises an inlet into which a bill is inserted, an inlet sensor disposed in the vicinity of the inlet for detecting insertion of the bill, a conveyer device for transporting the bill inserted from the inlet along a passageway formed in the validator, a validator sensor disposed adjacent to the passageway, and a validator control circuit connected to the inlet and validator sensors for controlling a motor of the conveyer device. The validator sensor includes an optical sensor for detecting an optically characteristic patterns of the bill which is formed by light reflected on or penetrating through the bill or a magnetic sensor for detecting magnetically characteristic patterns of the bill by a ferrous ingredient of ink printed on the bill.

When the bill is inserted from the inlet, the inlet sensor detects the insertion of the bill to produce an output to the validator control circuit which then drives the motor of the conveyer device to transport the bill inside the bill validator along the passageway. When the bill moves through the passageway, the validator sensor detects the optically or magnetically characteristic patterns of the bill and produces detection signals to the validator control circuit so that the validator control circuit discriminates authenticity of the bill inserted into the inlet. When the validator control circuit recognizes the inserted bill as genuine, it is accumulated in a stacker, and some merchandise is dispensed from a vending machine or a game is started in a gaming machine. On the other hand, when the circuit decides that the inserted bill is not genuine, the motor is adversely rotated to return the bill to the inlet.

By the way, current validators need downloading or renewal of necessary data in a memory to update or modify the stored operating program or adjust sensible level of the sensor. In addition, for example, casinos and gaming or gambling accommodations utilize various kinds of gambling machines with validators for reading and writing data on coupons or scripts, identification or code numbers of the accommodations, an identification number of a gaming machine electrically connected to the validators, however, sometimes these data must be modified or changed, and accordingly, the operating data stored in the validators must be updated or renewed. Also, updated data is required to be downloaded on the validators regarding optically or magnetically characteristic patterns on bills, kinds of bills to be examined by the validator, software for controlling the operating sequence of the validator, data for maintenance of the validator and various kinds of identification numbers. In a download operation of operating data to prior art validators, they must be electrically connected to a personal computer or a master bill validator as a host machine after a lid of the validator is opened. The connecting operation of the validators to the host machine is cumbersome and it is very dangerous to open the validators, exposing stackers with accumulated bills contained therein.

Accordingly, an object of the present invention is to provide method and apparatus for renewing software in a software operated machine without opening or disassembling the machine. Another object of the invention is to provide method and apparatus for renewing software in a software operated machine in a very easy method. Still another object of the invention is to provide method and apparatus for renewing software in a bill validator for discriminating bills without a host machine such as personal computer or master bill validator.

DISCLOSURE OF THE PRESENT INVENTION

In a method for renewing software according to the present invention, a software-controlled machine comprises a sensor means (16) and an operation control circuit (50) connected to the sensor means (16), and the operation control circuit (50) has a renewal control program. The sensor means (16) detects external command information to convert it into electric signals and thereby certainly switches the operation control circuit (50) from an operating mode to a renewal mode, thereby preventing unauthorized shifting of the operation control circuit (50). Then, the sensor means (16) detects external operating data on software and converts it into electric signals to store them in a program memory (53) for renewal of the software in accordance with the renewal control program. In this case, an alarm device (54) may be disposed in the vicinity of the inlet (13) to produce a signal indicative of the renewal mode. After completion of storing the operating data, the operation control circuit (50) is shifted from the renewal mode to the operating mode to operate the machine with the renewed operating data. Accordingly, the operating data can easily and safely be renewed without troublesome operation and opening of the machine.

In an embodiment of the invention, the command information and operating data are written respectively on a command card (1) and an information card (2) by printing or writing implements. Accordingly, the sensor means (16) first reads the command information on the command card (1) to shift the operation control circuit (50) from the operating mode to the renewal mode, and then reads the operating data on the information card (2) to store the operating data in the program memory (53) in accordance with the renewal control program. Thus, new operating data can be downloaded to the program memory (53) in the validator (10) only by successively inserting into the inlet (13), the command card (1) and information card (2) so that after the updating, the machine operates in accordance with the renewed operating data.

In another embodiment of the invention, the command information and operating data can be conveyed with electromagnetic wave to the sensor means (16). The software-controlled machine may be a validator (10) with an inlet (13), the sensor means (16) may be an optical or magnetic sensor (41, 42) wherein the reading process of the command information comprises inserting the command card (1) into the inlet (13); reading the command information from the command card (1) by the sensor means (16), and discharging the command card (1) from the validator (10). The reading process of the operating data comprises inserting the information card (2) to the inlet (13), reading the operating data contained in the information card (2) by the sensor means (16) to store the operating data in a program memory (53) in accordance with the renewal control program, and discharging the information card (2) from the validator (10). After completion of storing the operating data, the operation control circuit (50) is shifted from the renewal mode to the operating mode to validate bills utilizing the renewed operating data.

The reading process of the command information further may comprise deciding by the operation control circuit (50) whether an insert into the inlet (13) is a genuine bill or the command card (1), shifting the operation control circuit (50) from the operating mode to the renewal mode when the operation control circuit (50) recognizes the insert as the command card (1) in view of the read information. The reading process of the operating data may comprise deciding by the operation control circuit (50) whether an insert into the inlet (13) is a genuine bill, command card (1) or the information card (2); storing the operating data in the program memory (53) in accordance with the renewal control program when the operation control circuit (50) recognizes the insert as the information card (2) in view of the read information.

The operating mode of the operation control circuit (50) may comprise detecting an insert entered into the inlet (13) of the validator (10) by an inlet sensor (40); driving a conveyer means (15) in response to an output of the inlet sensor (40) to transport the insert along a passageway (12) inside the validator (10); detecting optically or magnetically characteristic patterns of the transported insert by the sensor means (16); and further moving the insert in the back of the sensor means (16) of the validator (10) when the operation control circuit (50) in the operating mode decides that the insert is a genuine bill. The conveyer means (15) is driven in the adverse direction to return the insert to the inlet (13) when the operation control circuit (50) in the operating mode decides that the insert is not genuine.

The apparatus for renewing software according to the present invention, comprises an operation control circuit (50) having software for controlling the machine and renewal control program for storing operating data as new software; a sensor means (16) connected to the operation control circuit (50); a first medium (1) containing command information which shifts the operation control circuit (50) from an operating mode to a renewal mode when the sensor means (16) detects the command information externally given to the sensor means (16); and a second medium (2) containing operating data which is stored in the program memory (53) for renewal of the software in accordance with the renewal control program during the renewal mode when the sensor means (16) detects the operating data externally given to the sensor means (16). The operation control circuit (50) is shifted from the renewal mode to the operating mode after completion of storing the operating data to operate the machine with the renewed operating data.

In a further embodiment of the invention, the first medium is a command card (1), and the second medium is an information card (2) so that the sensor means (16) first reads the command information on the command card (1), and then reads the operating data on the information card (2). The command card (1) and information card (2) may be made into a combined card including the command information and operating data. At least a transmitter may be provided to convey the command information and operating data with electromagnetic wave to the sensor means (16).

The operating data read out from the information card (2) by the sensor means (16), includes information necessary to discriminate at least one of the optically or magnetically characteristic patterns of papers, idnds of papers to be discriminated by the validator (10), operating software for controlling the operating sequence of the validator (10), acceptable criterion of papers by the validator (10), requirement for adjusting the sensor means (16), maintenance data of the validator (10) and an identification number of a main device equipped with the validator (10).

The operation control circuit (50) may comprise an analytical program for analyzing the operating data read out from the information card (2). A program memory (53) is connected to the operation control circuit (50) to store an operating software for operating the operation control circuit (50) together with the operating data read out from the information card (2) in accordance with the renewed software in the program memory (53).

The apparatus may comprise an inlet sensor (40) for detecting an insert entered into an inlet (13) of the validator (10); and a conveyer means (15) for transporting the insert along a passageway (12) in response to an output of the inlet sensor (40). The operation control circuit (50) receives the output signal of the sensor means (16) to examine whether the insert is a genuine bill so that the operation control circuit (50) controls the conveyer means (15) to transport the insert along the passageway (12) and further move it to the inner side of the validator (10) when the operation control circuit (50) recognizes the insert as a genuine bill.

Each of the command cards (1) is used to individually correspond to different kind of each operating data, and similarly each of the information cards (2) is used to corresponds to each command card (1) inserted into the inlet (13).

BEST MODE FOR EMBODIMENT OF THE INVENTION

The method and apparatus for renewing software according to the present invention can be applied to many and various kind of software-operated machines, and, as a typical example applied to a bill validator, an embodiment of the present invention is described hereinafter in connection with FIGS. 1 to 5 of the attached drawings. However, it should be noted that the present invention is not limited only to the specified embodiment because it apparently can be applied and practiced to all software-operated machines which need renewal or updating of the software contained therein for at least one of many purposes.

Figure 1:
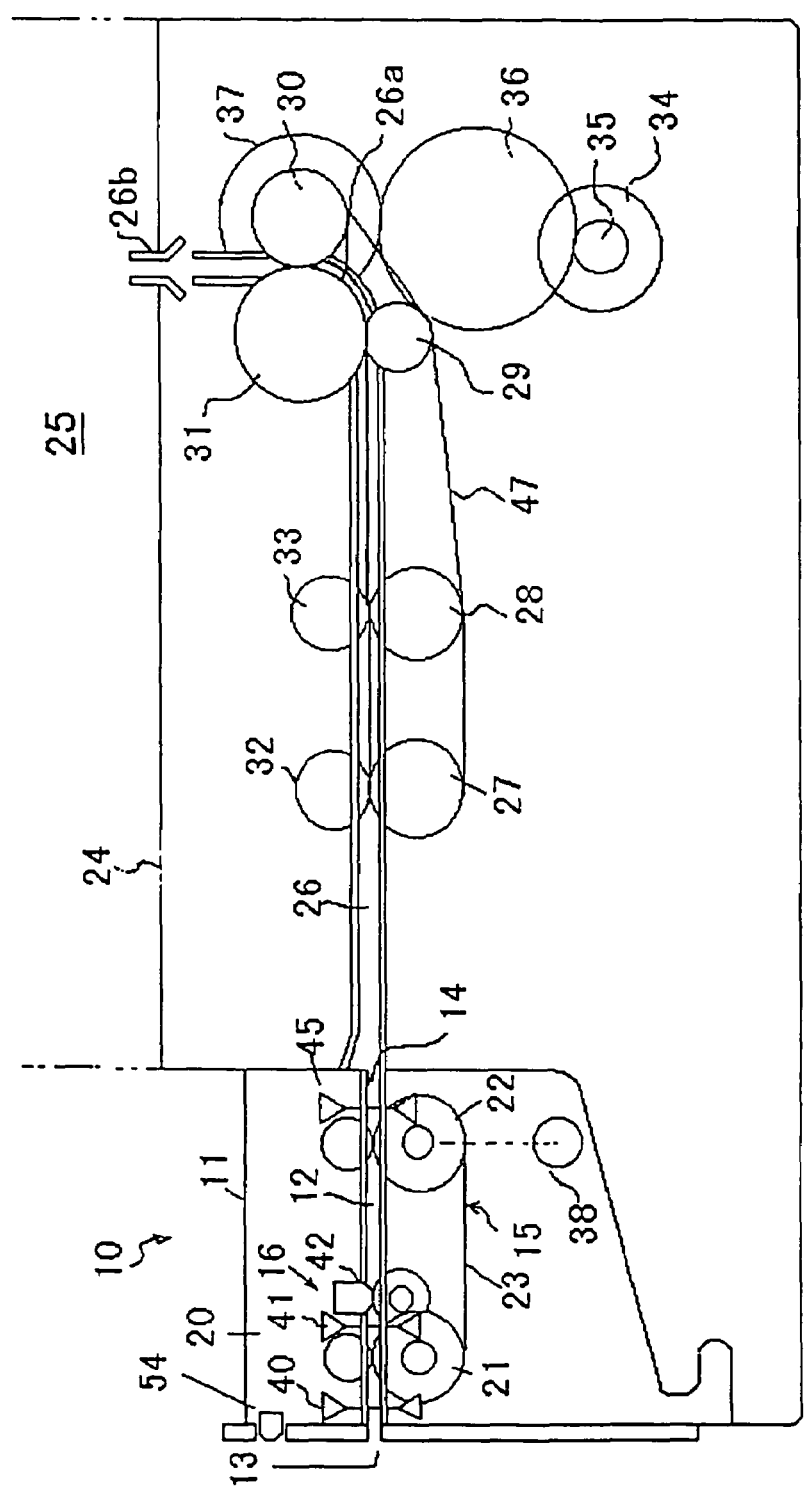
FIG. 1 is a cross-sectional view of a bill validator embodied by an apparatus for renewing software in a software-operated machine according to the present invention.

FIG. 1 shows a typical embodiment of the present invention applied to a bill validator 10 as a software-controlled machine which includes a case 11, a conveyer means 15 for transporting the bill inserted from an inlet 13 provided on a front surface of the validator 10 through a passageway 12 formed in the case 11 to an outlet 14 formed at an inner end of the passageway 12, and a sensor means 16 disposed adjacent to the passageway 12. The sensor means 16 comprises an optical sensor 41 such as a photocoupler and a magnetic sensor 42 such as a magnetic head to take optically or magnetically characteristic patterns of a paper and convert them into electric signals to an operation control circuit 50 mounted in the validator 10. Provided in the inlet 13 of a discriminating unit 20 is an inlet sensor 40 which detects insertion of the bill into the inlet 13 to produce a detection signal to the operation control circuit 50. An outlet sensor 45 is provided in proximity to the outlet 14 of the passageway 12 to detect the passage of the bill and produce detection signal to the operation control circuit 50. The conveyer means 15 includes a pair of pulleys 21, 22, a belt 23 wound around the pulleys 21, 22 and a conveyer motor 38 operatively connected to the pulley 22 to transport the bill from the inlet 13 to the outlet 14.

Connected to the outlet 14 of the discriminating unit 20 is a transport means 24 which carries the bill discharged from the outlet 14 to a stacker 25 as a paper storage area along a carrier passage 26 in alignment with the passageway 12 of the discriminating unit 20. To this end, the transport means 24 comprises transport pulleys 27 to 31 adjacent to the carrier passage 26, and a belt 47 wound around transport pulleys 27 to 31. The upper ends of the three transport pulleys 27 to 29 are nearly disposed on a same horizontal plane to carry a bill along a linear way to the transport pulley 31 which forms a bent portion 26a of the carrier passage 26.

Push rollers 32, 33 are disposed in compressed contact to respectively the transport pulleys 27, 28 to firmly hold the paper between the pulley 27 and roller 32 and between the pulley 28 and roller 33 and move it backward to an outlet 26b connected to an inlet (not shown) of the stacker 25 through the upwardly curved bent portion 26a of the carrier passage 26. The belt 47 is wound around the transport pulley 30 to drive the belt 47 in contact to the transport pulley 31 provided in the opposite side of the carrier passage 26 so that the paper can certainly be conveyed through the bent portion 26a to the outlet 26b. A pinion 35 is secured to an output shaft of a transport motor 34 and is mated with an intermediate gear 36 which is then meshed with a last stage gear 37 to rotate the transport pulley 30 and drive the belt 47 by rotation of the transport pulley 30.

Figure 2:
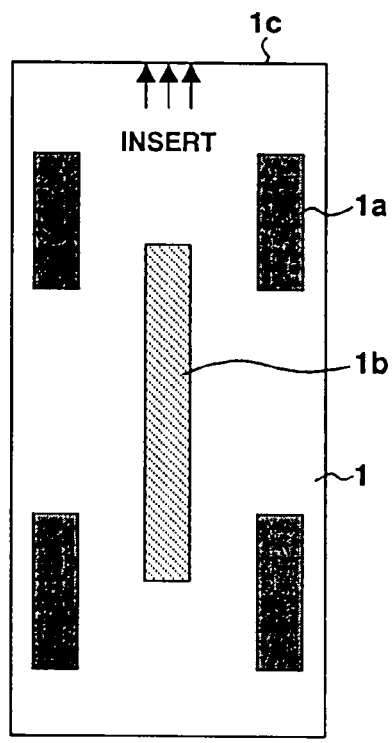
FIG. 2 is a plan view of a command card.
Figure 3:
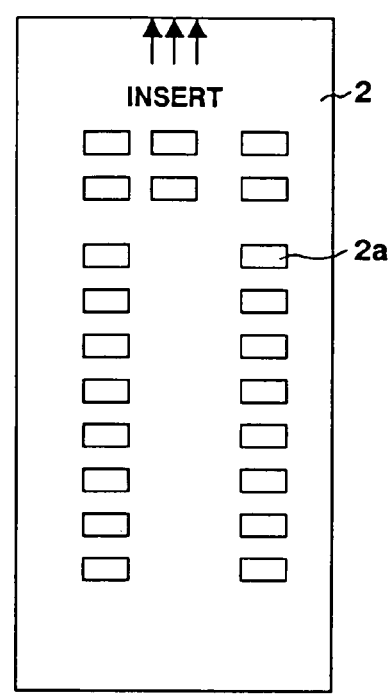
FIG. 3 is a plan view of an information card.

FIGS. 2 and 3 respectively show each example of a command card 1 as a first medium and an information card 2 as a second medium for coupled use. As shown in FIG. 2, the command card 1 bears four magnetic areas 1a printed on the front surface to provide specific magnetic patterns or codes and an optical area 1b printed on the back surface to provide specific optical patterns or a bar code to identify the kind of the command card 1. The magnetic areas 1a and optical area 1b provide external command information sensible or detectable by the sensor means 16 of the optical sensor 41 and magnetic sensor 42. The information card 2 shown in FIG. 3 may preferably be a marked card which indicates many blank items 2a to be selected for renewal by marking with a pencil, etc. The marked items 2a provide external operating data on software sensible or readable by the sensor means 16 of the optical sensor 41.

Figure 4:
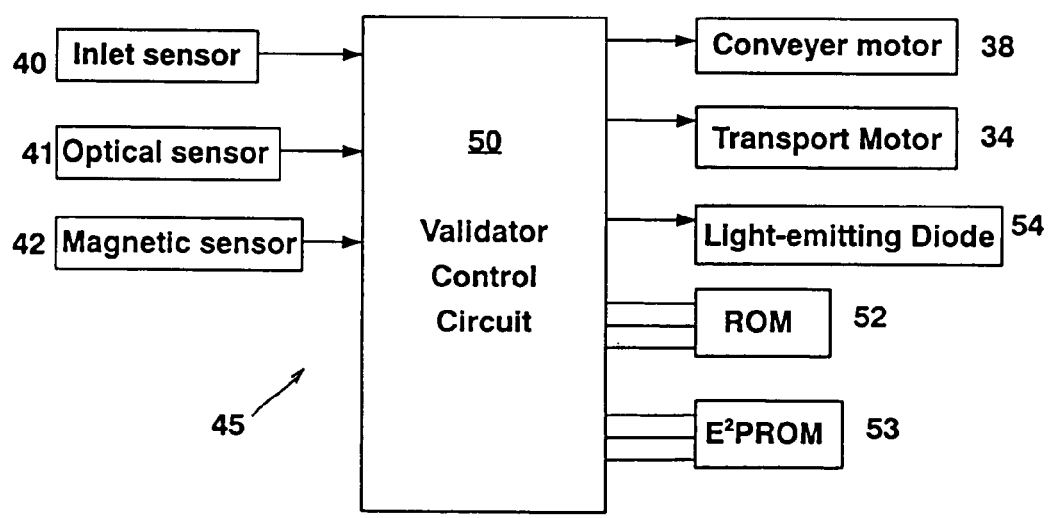
FIG. 4 is a block diagram indicating an electrical circuit of the validator according to the present invention.

FIG. 4 shows a block diagram of the electrical circuit 45 used in the validator 10 to validate authenticity of the bill by the output signal from the sensor means 16. The circuit 45 comprises the operation control circuit 50 having input terminals each connected to the inlet sensor 40 for detecting a bill inserted into the inlet 13, an optical sensor 41 for detecting an optically characteristic patterns of the transported bill and a magnetic sensor 42 for detecting a magnetically characteristic patterns of the transported bill.

The operation control circuit 50 has output terminals each connected to the conveyer motor 38 disposed in the discriminating unit 20 for transporting the bill along the passageway 12, the transport motor 34 disposed in the transport means 24 for transporting the bill along the carrier passage 26 to the outlet 26b, a light-emitting diode (LaED) 54 as an alarm device disposed in the vicinity of the inlet 13 for demonstrating the renewal mode, a discrimination data memory 52 of ROM (Read Only Memory) for storing discrimination data for validating a plurality of different bills, and a program memory 53 of $E^2PROM$ for storing software and the operating data read out from the information card 2 to control operation of the validator 10. For example, the operating data renewable by the information card, may include at least one of the optically or magnetically characteristic patterns or kinds of papers to be validated by the validator 10, software for controlling the operating sequence of the validator 10, kinds of papers acceptable by the validator 10, adjusting requirement of sensor means 40, 41, 42, data on maintenance of the validator 10, and an identification number or serial number of a main device equipped with the validator 10 such as a gaming machine or a vending machine.

The program memory 53 can be disposed in any one of the validator 10, the transport means 24, and the stacker 25. The operation control circuit 50 involves an analytical program for analyzing operating data read out from the information card 2 and an operating software for operating the operation control circuit 50 in accordance with the operating data stored in the program memory. The analytical program and operating software are not shown in the drawings and previously installed in the operation control circuit 50.

The operation of the bill validator 10 is described hereinafter in connection with the operating sequence of a flow chart shown in FIG. 5.

Figure 5:
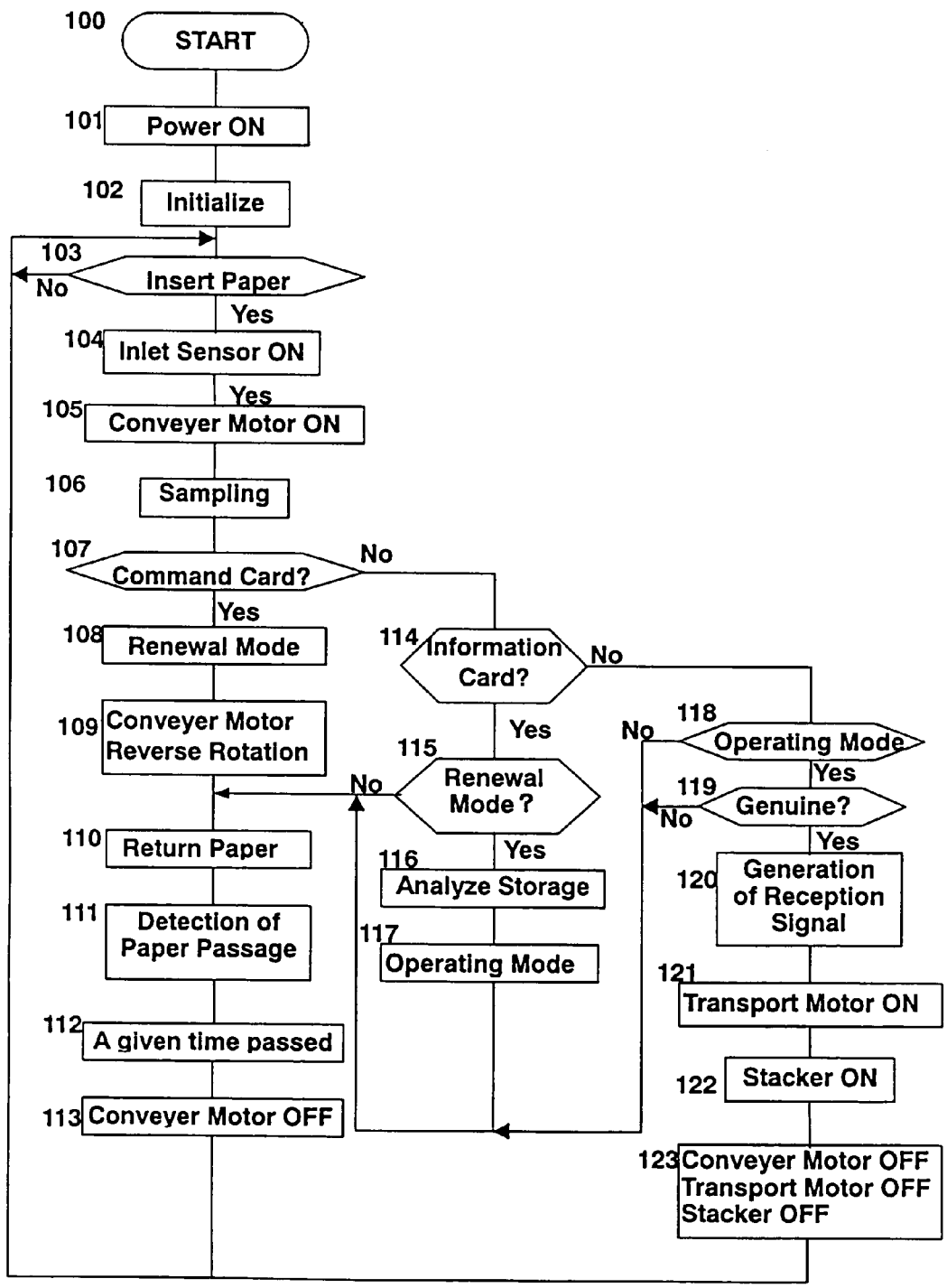
FIG. 5 is a flow chart indicating an operating sequence of an operation control circuit.

In FIG. 5, when a main switch (not shown) of the validator 10 is turned ON, a processing moves from Step 100 "START" to Step 101 to initialize the control program of the operation control circuit 50 in Step 102. Then, the operation control circuit 50 judges in Step 103 whether a paper is inserted into the inlet 13. If a paper or an insert is entered into the inlet 13, the inlet sensor 40 is turned ON in Step 104 to detect the insertion of the paper and produce a detection signal to the operation control circuit 50 which therefore drives the conveyer motor 38 in Step 105. Accordingly, in response to the detection signal of the inlet sensor 40, the conveyer motor 38 is rotated in a forward direction to move the paper inside the validator 10. Subsequently, the optical and magnetic sensors 41, 42 pick up optical and magnetic data from the moving paper into electric signals to the operation control circuit 50 for sampling in step 106.

In Step 107, the operation control circuit 50 decides in view of the sampled data in Step 106 whether the insert is a command card 1 or not. If the circuit 50 recognizes the insert as a command card 1, it is shifted in Step 108 from the operating mode for allowing the circuit 50 to validate authenticity of the inserted paper to the renewal mode for allowing the circuit 50 to receive the operating data on an information card 2. During the renewal mode of the circuit 50, it turns on the LED 54 disposed in the vicinity of the inlet 13 to demonstrate the renewal mode, and drives the conveyer motor 38 in the adverse direction in Step 109 to return the command card 1 to the inlet 13 in Step 110. When the inlet sensor 40 detects passage of the retreating front edge 1c of the command card 1 in Step 111, the operation control circuit 50 starts operation of a timer to count time. Then, after a given time, for example fifteen seconds is counted by the timer in Step 112, the operation control circuit 50 ceases operation of the conveyer motor 38 in Step 113, and the processing is returned to Step 103.

When an information card 2 is inserted into the inlet 13 in Step 103, similar processes are performed through Steps 103 to 107, and the processing moves from Step 107 to 114. Therefore, the operation control circuit 50 detects the information card 2 in Step 114, and the stage comes to Step 116 through Step 115 because of the renewal mode. In Step 115, if it is not the renewal mode, it goes to Step 110. In Step 116, the analytical program of the operation control circuit 50 analyzes the operating data read out by the sensor means 16 from the information card 2 and then the operating data is stored in the program memory 53.

For example, the command card 1 can switch the operation control circuit 50 to the renewable condition that may change or modify an acceptable kind of bills. The information card 2 bears writable information on kind of bills to be validated by the validator 10, such as denominations of currency ¥10,000; ¥5,000; and ¥1,000; four inserting directions inclusive of each two inserting directions of the front and back surfaces; a acceptable level for bills, and a pulse number for identification of a kind of the currency.

In Step 117, the operation control circuit 50 is automatically shifted from the renewal mode to the operating mode after the operating data is stored in the program memory 53, and the processing moves to Step 110, and the processing is performed through Steps 110 to 113 to return the information card 2 to the inlet 13. Therefore, from now on, the operation control circuit 50 is operated to validate papers in accordance with the updated operating data stored in the program memory 53.

When the inserted paper is considered not the information card 2 in Step 114, the stage goes to Step 118 to judge whether the validator 10 is in the operating mode or not. In the operating mode, the operation control circuit 50 decides in Step 119 whether the inserted paper is genuine or not. When the validator 10 is not in the operating mode or when the inserted paper or bill is not genuine in Step 119, the processing jumps onto Step 110 to return the insert to the inlet 13 through Steps 110 to 113, and moves to Step 103. When the paper is genuine in Step 119, the operation control circuit 50 produces a reception signal in Step 120 to a host computer or associated machine such as a gaming machine or vending machine. Then, the circuit 50 operates the transport motor 34 in Step 121 to further move the bill to the stacker 25 which is operated in Step 122 to accumulate the bill in the stacked condition. Finally, the circuit 25 ceases the operations of the conveyer motor 38, the transport motor 34 and the stacker 25 in Step 123 and the processing is returned to Step 103.

The present invention can be modified in various ways. For example, the command card 1 and information card 2 may be made into a combined or integrated card including both of the command information and operating data. In lieu of the command card 1 and information card 2, electromagnetic wave can be conveyed to the sensor means 16 such as visible ray, infrared ray, ultraviolet ray or radio wave including the command information and operating data by emitting from a message transmitter and receiving the electromagnetic wave by the sensor means 16. The message transmitter may provide coupled first and second media to contain the command information and operating data. The operating data may be stored or printed in the information card 2 as magnetic areas or optical areas on the information card 2 other than marked items 2a. Each of the command card 1 shifts the operation control circuit 50 to the renewal mode to approve new operating data by the corresponding information card 2. The command card 1 may switch the operation control circuit 50 to a maintenance mode wherein error log or receiving percentage of bills is indicated upon insertion of the information card 2 into the inlet 13. The information card 2 may automatically adjust the sensible level of the optical sensor 41 by detecting an amount of light reflected on or penetrating through a white paper as well as utilizing the marked sheets. Also, in another aspect, the information card 2 may adjust the sensible level of the magnetic sensor 42 by detecting magnetic labels attached on a card.

Moreover, the program memory 53 may be disposed in one of the validator 10, the transport means 24 and the stacker means 25 as a cassette box. In this case, the program memory 53 can electrically be connected to the operation control circuit 50 through an electrically conductive connector or a photocoupler of non-contact type. For example, the information card 2 bears the serial or identification number of a gaming or vending machine equipped with the validator 10 so that this data can be downloaded or renewed in the program memory 53 disposed in the stacker 25 through the operation control circuit 50 of the validator 10 to identify the gaming or vending machine with the collected stacker.

The above-mentioned embodiments of the present invention is directed to the a method and apparatus for validating bills, however, the invention is not limited to this embodiment and applicable to method and apparatus for renewing software in various kinds of software-controlled machines. Of course, the validator described herein would be applicable to gaming machines, cash dispensers or a money exchangers to validate currency, coupons, scripts or other valuable documents.

As mentioned above, the present invention can materialize easy, prompt and efficient renewal operation of software in a software-operated machine or hardware by detecting prepared external command information and operating data by a sensor means with effective prevention of theft without opening the machine.

The invention claimed is:

1. A method for renewing software in a software-controlled machine that comprises a sensor means and an operation control circuit connected to said sensor means, the operation control circuit containing a renewal control program, said method comprising the steps of:
   writing command information and operating data on software respectively on a command card and an information card;
   detecting said command information on said command card by said sensor means to shift the operation control circuit from an operating mode to a renewal mode;
   detecting said operating data on said information card by said sensor means;
   storing the operating data in the operation control circuit of the renewal mode for renewal of the software in accordance with said renewal control program;
   shifting the operation control circuit from the renewal mode to the operating mode; and
   operating the machine with the renewed operating data.

2. The method of claim 1, wherein the detecting process of the command information comprises reading said command information on said command card by said sensor means; and
   the detecting process of the operating data comprises reading said operating data on said information card.

3. The method of claim 1, wherein said software-controlled machine is a validator with an inlet and an optical or magnetic sensor as said sensor means;
   the detecting process of the command information comprises inserting the command card into the inlet, reading command information from the command card by said sensor means, and discharging the command card from the validator;

the detecting process of the operating data comprises inserting said information card into the inlet, reading the operating data contained in said information card by said sensor means to store the operating data in a program memory in accordance with said renewal control program, and discharging the information card from the validator; and after completion of storing the operating data, validating bills utilizing the renewed operating data.

4. The method of claim 3, wherein the detecting process of the command information further comprises deciding by the operation control circuit whether an insert into the inlet is a genuine bill, the command card or the information card, and upon recognition of the command card, the operation control circuit is shifted from the operating mode to the renewal mode;

upon recognition of the information card, the operating data is stored in the operation control circuit in accordance with said renewal control program.

5. The method of claim 3, wherein the operating mode of the operation control circuit of the validator comprises detecting an insert entered into the inlet of the validator by an inlet sensor; driving a conveyer means in response to an output of said inlet sensor to transport the insert along a passageway inside the validator; optically or magnetically detecting characteristic of the transported insert by said sensor means; and further moving the insert in the back of said sensor means of the validator when the operation control circuit in the operating mode decides that the insert is a genuine bill.

6. The method of claim 5, further comprising driving said conveyer means in the adverse direction to return the paper to the inlet when the operation control circuit in the operating mode decides that the paper is not a genuine bill.

7. The method of claim 3, further comprising producing a signal from an alarm device to indicate the renewal mode.

8. An apparatus for renewing software in a software-controlled machine, comprising an operation control circuit that has software for controlling said machine and renewal control program for storing operating data as new software;

a sensor means connected to said operation control circuit;

a command card containing command information which shifts the operation control circuit from an operating mode to a renewal mode when the sensor means detects the command information on the command card; and an information card containing operating data to be detected by the sensor means and then stored in a program memory connected to the operation control circuit for renewal of the software in accordance with said renewal control program during the renewal mode of the operation control circuit;

wherein after completion of storing the operating data, the operation control circuit is shifted from the renewal mode to the operating mode to operate the machine with the renewed operating data.

9. The apparatus of claim 8, wherein said command card and information card are made into a combined card including the command information and operating data.

10. The apparatus of claim 8, wherein said software-controlled machine is a validator that comprises an inlet and an optical or magnetic sensor as said sensor means.

11. The apparatus of claim 10, wherein the operating data includes information necessary to discriminate at least one of the optically or magnetically characteristic patterns of papers, kinds of papers to be discriminated by the validator, operating software for controlling the operating sequence of the validator, acceptable criterion of papers by the validator, requirement for adjusting the sensor means, maintenance data of the validator and an identification number of a main device equipped with the validator.

12. The apparatus of claim 10, further comprising an inlet sensor for detecting an insert entered into the inlet of said validator; and a conveyer means for transporting the insert along a passageway in response to an output of said inlet sensor;

wherein said operation control circuit receives the output signal of said sensor means to validate whether the insert is a genuine bill;

whereby said operation control circuit controls the conveyer means to transport the insert along the passageway and further move the insert when the operation control circuit recognizes the insert as a genuine bill.

13. The apparatus of claim 10, wherein each of the command cards is used to individually correspond to a different kind of the operating data, and each of the information cards is used to correspond to each command card inserted into the inlet.

14. The apparatus of claim 10, further comprising an alarm device disposed in the vicinity of the inlet for producing a signal indicative of the renewal mode.

15. The apparatus of claim 8, wherein said operation control circuit comprises an analytical program for analyzing the operating data read out from the information card; and an operating software for operating the operation control circuit in accordance with the renewed software in the program memory.

* * * * *